United States Patent
Deghel et al.

(10) Patent No.: US 11,770,173 B2
(45) Date of Patent: Sep. 26, 2023

(54) TRANSMISSION RECEPTION POINT-SPECIFIC BEAM FAILURE INDICATIONS IN MULTI-TRANSMISSION RECEPTION POINT SCENARIOS

(71) Applicant: Nokia Technologies Oy, Espoo (FI)

(72) Inventors: Matha Deghel, Paris (FR); Timo Koskela, Oulu (FI); Keeth Saliya Jayasinghe Laddu, Espoo (FI); Sami Hakola, Kempele (FI); Youngsoo Yuk, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/314,585

(22) Filed: May 7, 2021

(65) Prior Publication Data
US 2021/0399784 A1      Dec. 23, 2021

Related U.S. Application Data

(60) Provisional application No. 63/042,473, filed on Jun. 22, 2020.

(51) Int. Cl.
*H04B 7/06*      (2006.01)
*H04W 72/02*      (2009.01)
(Continued)

(52) U.S. Cl.
CPC .......... *H04B 7/0695* (2013.01); *H04W 72/02* (2013.01); *H04W 72/21* (2023.01); *H04W 72/53* (2023.01); *H04W 80/02* (2013.01)

(58) Field of Classification Search
CPC ............................ H04B 7/0695; H04W 72/02; H04W 72/0413; H04W 72/0493; H04W 80/02;
(Continued)

(56) References Cited

U.S. PATENT DOCUMENTS

| 2018/0124831 | A1* | 5/2018 | Dinan ................. H04L 41/0813 |
| 2019/0058517 | A1 | 2/2019 | Kang et al. |

(Continued)

FOREIGN PATENT DOCUMENTS

| CN | 110521139 A | 11/2019 |
| WO | 2018/201457 A1 | 11/2018 |
| WO | 2020/012594 A1 | 1/2020 |

OTHER PUBLICATIONS

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

(Continued)

*Primary Examiner* — Harry H Kim
(74) *Attorney, Agent, or Firm* — SQUIRE PATTON BOGGS (US) LLP

(57) ABSTRACT

According to one example embodiment, a method may include receiving, by a user equipment, at least one network entity failure indication configuration. The method may further include detecting, by the user equipment, that at least one first network entity satisfies at least one beam-failure condition. The method may further include selecting, by the user equipment, one or more of at least one resource and at least one parameter based on the at least one received network entity failure indication configuration. The method may further include transmitting, by the user equipment, the at least one indication of the at least one first network entity that satisfies the at least one beam-failure condition to at least one second network entity.

14 Claims, 7 Drawing Sheets

(51) Int. Cl.
    *H04W 72/04*     (2009.01)
    *H04W 80/02*     (2009.01)
    *H04W 24/10*     (2009.01)
    *H04W 48/16*     (2009.01)
    *H04W 24/04*     (2009.01)
    *H04W 24/08*     (2009.01)
    *H04W 72/21*     (2023.01)
    *H04W 72/53*     (2023.01)

(58) Field of Classification Search
    CPC ..... H04W 24/10; H04W 48/16; H04W 24/04; H04W 24/08; H04W 72/042
    See application file for complete search history.

(56) References Cited

U.S. PATENT DOCUMENTS

| | | | | |
|---|---|---|---|---|
| 2019/0349061 A1* | 11/2019 | Cirik | .................. | H04L 1/1896 |
| 2021/0029745 A1* | 1/2021 | Zhang | .................. | H04W 80/02 |
| 2021/0368457 A1* | 11/2021 | Chen | .................. | H04L 5/0035 |
| 2021/0376909 A1* | 12/2021 | Khoshnevisan | ...... | H04W 72/02 |
| 2022/0039096 A1* | 2/2022 | Wang | .................. | H04W 72/044 |
| 2022/0174685 A1* | 6/2022 | Lee | .................. | H04B 1/74 |
| 2022/0190977 A1* | 6/2022 | Lee | .................. | H04B 17/336 |

OTHER PUBLICATIONS

"3rd Generation Partnership Project; Technical Specification Group Radio Access Network; NR; Physical layer procedures for control (Release 16)", 3GPP TS 38.213, V16.1.0, Mar. 2020, pp. 1-156.

"New WID: Further enhancements on MIMO for NR", 3GPP TSG RAN Meeting #86, RP-193133, Agenda: 9.1.1, Samsung, Dec. 9-12, 2019, 5 pages.

"CR on remaining issues in BFD requirements (section 8.5.1, 8.5.2, 8.5.3)", 3GPP TSG-RAN4 Meeting #90bis, R4-1904706, Huawei, Apr. 8-12, 2019, 6 pages.

International Search Report and Written Opinion received for corresponding Patent Cooperation Treaty Application No. PCT/EP2021/061642, dated Jul. 27, 2021, 18 pages.

"Beam Recovery for Full and Partial Control Channel Failure", 3GPP TSG RAN WGl Meeting 90bis, R1-1718389, Agenda Item: 7.2.2.4, AT&T, Oct. 9-13, 2017, 6 pages.

"On Rel.17 FeMIMO WI", 3GPP TSG RAN WG1 #101, R1-2003918, Agenda item: 8.5, Samsung, May 25-Jun. 5, 2020, 12 pages.

Indian Office Action corresponding to IN Patent Application No. 202347003578, dated May 24, 2023.

* cited by examiner

TRANSMISSION RECEPTION POINT-SPECIFIC BEAM FAILURE INDICATIONS IN MULTI-TRANSMISSION RECEPTION POINT SCENARIOS

RELATED APPLICATION

This application claims priority to U.S. Provisional Application No. 63/042,473, filed on Jun. 22, 2020, which is incorporated herein by reference in its entirety.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for user equipment to notify a network that a transmission reception point is in a beam failure condition.

BACKGROUND

Examples of mobile or wireless telecommunication systems may include 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine type communication (mMTC). NR is expected to deliver extreme broadband, ultra-robust, low latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for a user equipment to notify a network that a transmission reception point is in a beam failure condition is not intended to limit the scope of certain embodiments, but is instead representative of selected example embodiments.

Figure 1:
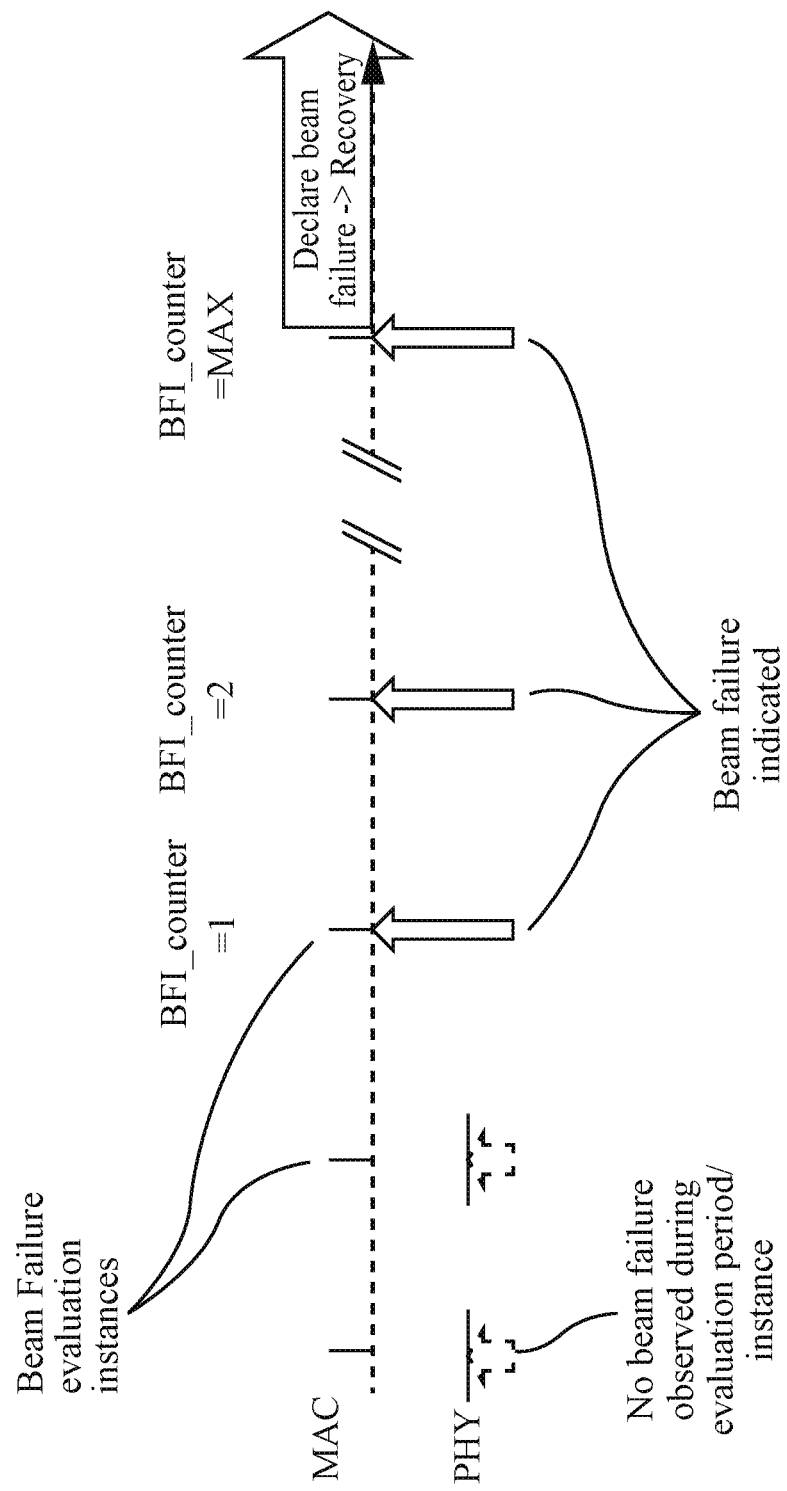
FIG. 1 illustrates an example of a medium access control layer detecting a beam failure.

Third Generation Partnership Project (3GPP) Release (Rel)-15 new radio (NR) defined how user equipment (UE) should declare beam failures using the medium access control (MAC) layer. As shown in FIG. 1, the physical (PHY) layer may not take any action until a beam failure instance is detected. Once detected, the PHY layer would indicate the beam failure instance to the MAC layer, which tallies these instances using counter N.

Each serving control channel needs to have failed for a beam failure instance to be detected. Hypothetical physical downlink control channel (PDCCH) block error rate (BLER) can be used to determine whether a serving control channel link is in a failure condition, where the BLER is calculated using measurements on a beam failure detection reference signal (BFD-RS) set. A set of BFD-RSs could include a number of synchronisation signal block (SSB) and/or channel state information reference signal (CSI-RS) indexes. And as noted above, each BFD-RS resource in the BFD-RS set needs to first be in a failure condition for a beam failure instance to be indicated to the MAC layer.

The UE can be configured in a variety of ways to determine the BFD-RS set. For example, a network entity (NE), such as a base station (BS), a transmission reception point (TRP), and/or the like, could explicitly configure the UE with at least one RS index configured for failure detection. In lieu of an explicit configuration, the UE may use an implicit configuration by default, where the BFD-RS set includes periodic CSI-RS and/or SSB listed in TCI-StatesPDCCH, which could be used to monitor PDCCH on at least one control resource set (CORESET). With this default configuration, the UE could anticipate that at least one periodic CSI-RS and/or SSB has a spatial quasi co-location (QCL) with at least one PDCCH demodulation reference signal (DMRS). Thus, the UE can determine a set of BFD-RS ($q_0$) to use for the RS indicated by an activated transmission configuration indicator (TCI) state for PDCCH.

3GPP Rel-15 also specified beam-failure recovery procedures for contention-based random access (CBRA) and contention-free random access (CFRA); however, the UE does not explicitly indicate BFR to the network with Rel-15 CBRA BFR. With CFRA recovery, a physical random-access channel (PRACH) preamble could be associated with a downlink reference signal (DRS) provided in a candidate beam RS list having SSB and/or CSI-RS parameters, which may be similar to set $q_1$ in 3GPP technical specification (TS) 38.213. If CFRA is configured, the UE could instead first select at least one candidate beam exceeding a reference signal received power (RSRP) threshold, such as rsrp-ThresholdSSBBFR. If no candidate beams exceed the RSRP threshold, the UE could instead use CBRA BFR, with the UE selecting an SSB and performing a standard random-access channel (RACH) procedure. Finally, if the UE is not configured with CFRA, the UE could use CBRA BFR.

While Rel-15 does not support UE indicating BFR to the network with CBRA BFR, Rel-16 allows for this indication using MAC control element (CE) for secondary cell (SCell) BFR. In particular, Rel-15 BFR was further enhanced in Rel-16 by adding failure detection for SCells. In SCell failure recovery, the UE could be configured with a scheduling request (SR) dedicated for SCell BFR. The UE can use this SR to indicate that beam failure has occurred for an SCell, and request resources for the MAC CE, thereby providing additional information on the failed SCell. The MAC CE could also be transmitted using an available uplink (UL) grant without transmitting the SR. The UE could send the SCell BFR MAC CE on an available UL grant in addition to a bitmap containing information on the failed SCell. A new candidate index may be selected from a list for each failed SCell, with each candidate index being suitable according to the RSRP threshold. The resulting candidate RS list would then be explicitly configured.

In multi-transmission reception point (TRP) scenarios, the BFD-RS set could be configured to include resources corresponding with TRPs serving the UE. For example, with two TRPs serving the UE, the BFD-RS could be explicitly configured with two CSI-RS indexes, with each CSI-RS index corresponding with a particular TRP. Alternatively, if the BFD-RS contains resources corresponding with only one TRP, the UE would declare a beam failure, and then initiate a RACH recovery procedure despite another TRP not satisfying failure conditions.

For beam measurements and reporting, Rel-15 specified support for differential and non-differential based reporting for both non-group and group-based beam reporting. Here, the UE could be configured to report measurements corresponding with up to four reference signals, such as CSI-RS or SSB, (in practice up to four beams) in a single reporting instance. Thus, the measurements could be reported with the N-strongest CSI-RS resource indicators (CRIs) and/or SSB resource indicators, where a 6-bit length field is reserved for each indicator and N≤4. A 7-bit length field could be reserved for the largest layer 1 (L1)-RSRP, from (−140 $dB_{mW}$ to −44 $dB_{mW}$), and a 4-bit length field could be reserved for differential L1-RSRP reporting. L1-RSRP and/or resource indicators configured for beam management would be mapped to the first CSI section when reported on a physical uplink shared channel (PUSCH) or long physical uplink control channel (PUCCH).

An important topic under the NR MIMO scope for Rel-17 is "Enhancements on the support for multi-TRP deployment," targeting frequency range 1 (FR1) and FR2. The list of objectives regarding the multi-TRP operation scope of work is described in 3GPP RP-193133, having objectives including: identifying and specifying features to improve reliability and robustness for channels other than physical downlink shared channel (PDSCH) using multi-TRP and/or multi-panel, with Rel-16 reliability features as the baseline; QCL/TCI-related enhancements to enable inter-cell multi-TRP operations, assuming multi-downlink control information (DCI) based multi-PDSCH reception; beam-management-related enhancements to provide simultaneous multi-TRP transmission with multi-panel reception.

A TRP-specific (i.e., per-TRP) beam failure recovery procedure is still undefined in 3GPP. While one serving TRP may not satisfy beam failure conditions, other TRPs may, leaving a need for rapid beam recovery and change in response to the failed TRP, for instance with a connected TRP, without requiring a 'full' BFR procedure typically used when each serving TRP has failed (i.e., when all the TRPs have failed from UE perspective). To enable TRP-specific BFD, the BFD-RS set may be split into subsets, with each BFD-RS subset being associated with a different TRP, such as according to a CORESET pool index. Thus, the UE could perform BFD procedures on each subset separately, and detect a failed TRP while other TRPs continue to operate. It is noted that 3GPP does not yet define such a TRP-specific BFD operation, but it is expected that 3GPP will ultimately define and enable one.

Figure 2:
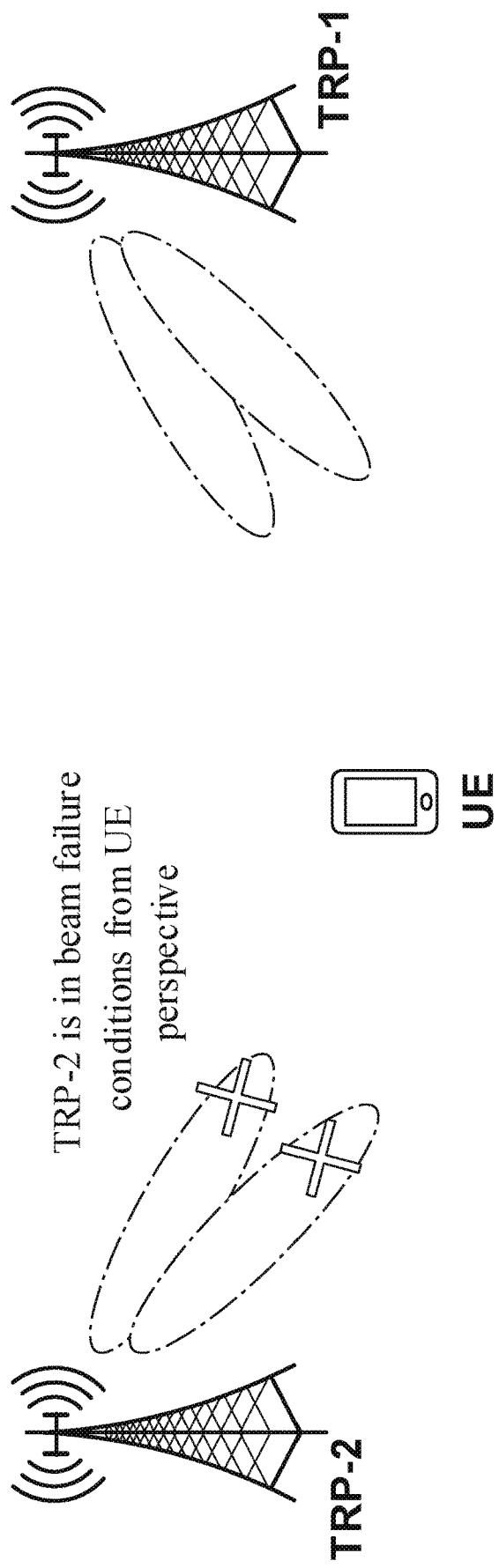
FIG. 2 illustrates an example of two transmission reception points serving a user equipment with one transmission reception point satisfying beam failure conditions.

As noted above, current beam failure procedures are triggered when each BFD-RS resource in the BFD-RS set satisfies failure conditions. Thus, for a BFD-RS set containing RS resources for two serving TRPs, beam failure will be declared when both serving TRPs fail. As illustrated in FIG. 2, the inability to initiate a beam failure recovery procedure when only one TRP satisfies failure conditions is a significant limitation. Referring back to the earlier discussion, enabling TRP-specific beam failure indications and recovery is of significant interest for future development.

Returning to the scenario illustrated in FIG. 2, the UE is configured to detect that TRP-2 satisfies failure conditions while TRP-1 is not in a failure condition. Two BFD-RS subsets may be configured, where each BFD-RS subset is associated with a different TRP. The network may need to be promptly notified of the failure of TRP-2 so that a rapid beam adjustment/recovery for the failed TRP can be performed e.g. using the non-failed TRP. In some scenarios, depending on the reasons for failure, the failed TRP may need to be replaced by another TRP. Rapid beam adjustment/recovery may be beneficial particularly when ultra-reliable and low-latency communication (URLLC) traffic is to be conveyed and/or when more than one TRP is needed to satisfy stringent URLLC latency and reliability requirements. Furthermore, recovering a failed TRP as soon as possible reduces the need for the UE to perform a comprehensive beam failure recovery procedure since, in this case, other TRPs are less likely to fail before recovering the first failed TRP. Any of the embodiments discussed herein may be applied for intra-cell and/or inter-cell multi-TRP. For example, TRP-1 and TRP-2 may be associated with different cells. Different cells may be identified by physical cell identity (PCI), and TRPs may be associated with different cells through association of CORESETs, CORESETPoolindexes, and/or the reference signals indicated by the active TCI states for PDCCH for the associated CORESET.

In some situations, the network may be able to use existing procedures to receive updated beam conditions of a TRP by configuring the UE to report beam-related information, such as configuring RSs corresponding to each TRP for beam reporting. However, such frequent reporting on beam conditions would require relatively high report loads when resource indicators and related L1-RSRP measurements are reported, as well as configuring frequent/periodic UL (PUCCH/PUSCH) resources to rapidly carry this high load. In addition, these resources would need to be configured such that the transmissions of such high report loads are also sufficiently reliable, requiring a significant amount of UL resources.

Certain embodiments described herein may have various benefits and/or advantages to overcome the disadvantages described above. For example, certain embodiments may quickly notify the network that a TRP is experiencing beam failure in multi-TRP systems with low resource overhead, particularly when transmitted using only (reliable) 1-bit information load. Various embodiments may have the additional benefit of allowing the network to quickly recover a failed TRP, thereby decreasing the need for the UE to perform a full/classical beam failure recovery procedure. Thus, certain embodiments discussed below are directed to improvements in computer-related technology.

Figure 3:
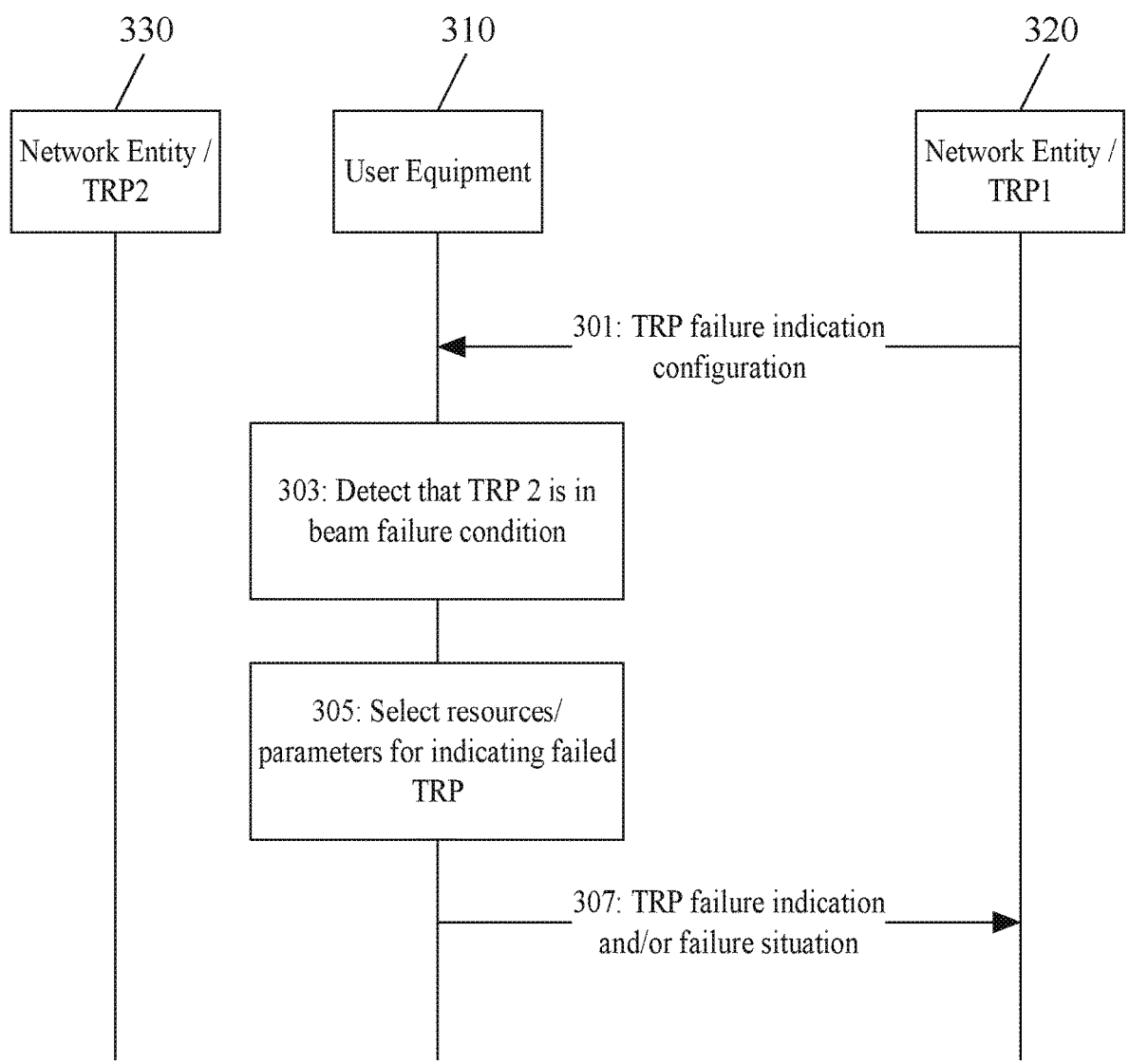
FIG. 3 illustrates an example of a signaling diagram according to certain embodiments.

FIG. 3 illustrates an example of a signaling diagram depicting a UE notifying a network that a NE (e.g., a TRP) is in beam failure condition. UE 310 may be similar to UE 610, and NE 320 (e.g., TRP1) and NE 330 (e.g., TRP2) may be similar to NE 620, which are both illustrated in FIG. 6, according to certain embodiments. While some techniques described below may discuss two TRPs in example embodiments, a different number of TRPs may be used. Furthermore, it is noted that some techniques below may also be applied to a group of beams and/or group of TRPs. For example, TRP beam failure indications may be configured to indicate a group of beams which have failed, where the beam group includes beams across multiple TRPs. Additionally, the methods described below may be similarly applied for link failure situations, where a TRP has experienced a radio link failure.

At 301, NE 320 may transmit to UE 310 any number of TRP failure indication configurations, which may contain several dedicated/shared UL resources and/or related parameters, and may be configured to allow UE 310 to indicate that a TRP is experiencing beam failure. For example, the dedicated/shared UL resources may be configured to carry any number of indications that at least one TRP satisfies beam failure conditions. These indications may include indication/indicator of the failed TRP and/or any other information configured to identify/characterize the failed TRP. In various embodiments, TRP indicators could be a CORESETPoolIndex, wherein UE 310 may assume that CORESETs configured with the same CORESETPoolIndex are associated with the same TRP. Additionally or alternatively, TRP indicators could be associated with any number of BFD-RS indexes, which may use a mapping and/or association between at least one TRP and at least one UL resource configured to carry TRP beam failure indications.

As an example, the TRP failure indication configurations may include configurations of periodic PUCCH resources, such as 'config-1' and 'config-2,' each of which is configured to transmit one bit information (e.g., bit '1') indicating failed TRPs. Config-1 may assist UE 310 in indicating to NE 320 that NE 330 has failed, while conversely, config-2 may assist UE 310 in indicating to NE 330 that NE 320 has failed. In another example, the TRP failure indication configurations may provide/configure at least one UL MAC CE to transmit the TRP beam failure indications.

At 303, UE 310 may detect that at least one TRP, such as NE 330, is in a beam failure condition, such as NE 330 satisfying at least one beam failure condition threshold. The detection by UE 310 may be based on at least one BFD-RS subset.

At 305, in response to the detection at 303, UE 310 may select at least one resource and/or at least one parameter received at 301 to use in reporting the at least one failed TRP (i.e., NE 330). In various embodiments, UE 310 may select which resources and/or parameters to use based on which TRP(s) have failed, or conversely, which TRP(s) are not in failure condition and not failed. In an example with two TRPs, UE 310 may be configured to transmit at least one information bit, such as 1-bit length, associated with particular resources to NE 320 indicating that NE 330 is in a beam failure condition. In another example with more than two TRPs, UE 310 could transmit at least one indicator of the failed TRP(s) on resources to NE 320.

As an example, UE 310 may detect that NE 330 is in beam failure condition, and that NE 320 is not in a beam failure condition. Using the configurations received at 301, UE 310 may use config-1 to indicate that NE 330 has failed. Specifically, UE 310 may use PUCCH resources provided in config-1 to transmit information-bit '1' to NE 320. For instance, config-1 may include resources with PUCCH format 0, and a specific cyclic shift may be configured to indicate the information-bit '1'. Alternatively, TRP failure indication configurations may cause UE 310 to indicate at least one identifier (e.g., CORESETPoolIndex) of NE 330 via UL MAC CE to NE 320.

In certain embodiments, UE 310 may select periodic and/or semi-persistent PUCCH resources to indicate the failed TRP(s), such as resources using PUCCH formats 0 and 1. For example, UE 310 may use a mapping/association between TRP failure indications, PUCCH resources, and resource/parameter configurations to indicate the failed TRPs, which could be based on any combination of cyclic shift, time/frequency resources, and spatial relation information.

Using the identified resources and/or parameters from 305, at 307, UE 310 may transmit at least one indication to NE 320 indicating the at least one failed TRP and/or failure situation. In some embodiments, UE 310 may also transmit the at least one indication via explicit uplink control information (UCI). In an example embodiment, where UE 310 is served by two TRPs, two configurations of dedicated periodic PUCCH resources of format 0 may be configured, where a first configuration may allow transmission to NE 320, while a second configuration may allow transmission to NE 330. Additionally, the at least one TRP failure indication may be transmitted via PUCCH format 0 by signaling, for example, with a single information bit, similar to a positive SR. As a result, in response to UE 310 detecting a TRP failure, UE 310 may use the configuration of periodic PUCCH resources associated with NE 320 to transmit the TRP failure indication to NE 320.

In some embodiments, UE 310 may use PUCCH formats having a bit map indicating failed RSs associated with the failed TRPs in ascending or descending order of CORESET index and/or CORESETPoolIndex. For example, where UE 310 is configured with 4 BFD-RS, UE 310 may transmit explicit information of the failed TRP/failed PDCCH beam combinations, allowing the network to identify TRP failures using bitmap information.

In various embodiments, PUSCH resources, such as configured grant resources, may be configured to carry TRP failure indications. For example, various parameters/configurations, such as DMRS, of configured-grant resources may carry the TRP failure indications. Additionally or alternatively, UE 310 may include TRP failure indications in the form of UCI on PUSCH—with or without uplink shared (transport) channels (UL-SCH) data. UE 310 may use various associations between PUSCH resources and the serving TRP(s) to select suitable resources to transmit TRP failure indications. For example, with two TRPs, two configured-grant PUSCH configurations may carry the indication, wherein each configuration may correspond with transmissions towards a different TRP, for example, by explicitly associating each configured-grant PUSCH configuration with a particular TRP. In order to avoid confusion where a configured grant occasion is used for data transmission only, each configuration may be configured with two DMRSs, where a first DMRS is used for TRP failure indication, and a second DMRS is used only for data transmission. Thus, when a TRP fails, UE 310 may notify the network by sending DMRS(s) indicating beam failure using the configured-grant configuration to the non-failed TRP, such as NE 320.

In some embodiments, UE 310 may be configured with any combination of UL RSs, such as sounding reference signals (SRS), resources, and related parameters to transmit TRP failure indications. For example, in case of two TRPs, two SRS resources may be used, with each SRS configured to carry TRP failure indications. When a TRP fails, UE 310 may transmit at least one SRS towards the non-failed TRP (i.e., NE 320), informing the network that NE 330 has failed. Furthermore, UE 310 may use at least one UL MAC CE to signal TRP failure indications, where UE 310 may request UL grants via dedicated and/or shared SR resources to transmit the MAC CE indicating the TRP failure indications, such as if UL (PUSCH) resources are unavailable.

In certain embodiments, UE 310 may be configured with any number of aperiodic/semi-persistent beam reporting configurations that can be activated when UE 310 transmits TRP failure indication(s). For example, UL indication(s) may indicate to the network, such as NE 320, that a failure has been detected on NE 330, and in response, UE 310 may receive a trigger to start beam reporting according to the configured UL resources. After new PDCCH beams are configured for UE 310, whereby TCI states for PDCCH are activated, UE 310 may discontinue the reporting and/or the reporting resources may be deactivated. Additionally or alternatively, if UE 310 does not receive a new TCI state for the failed PDCCH after N reporting periods, UE 310 may discontinue reporting, and/or may discontinue monitoring the PDCCH on CORESET(s) of NE 330. In one example embodiment, if network has triggered the beam reporting and cancels the reporting, UE 310 may cease the monitoring of the PDCCH on the failed CORESET or CORESETs of the failed TRP. In an example embodiment, NE 320 may configure UE 310 to provide beam reporting, such as CSI-ReportConfig, of a specific set of reference signals, such as in CSI-ResourceConfig. The resource configuration and reporting may be specific for, and conditioned to, the indicated TRP.

Figure 4:
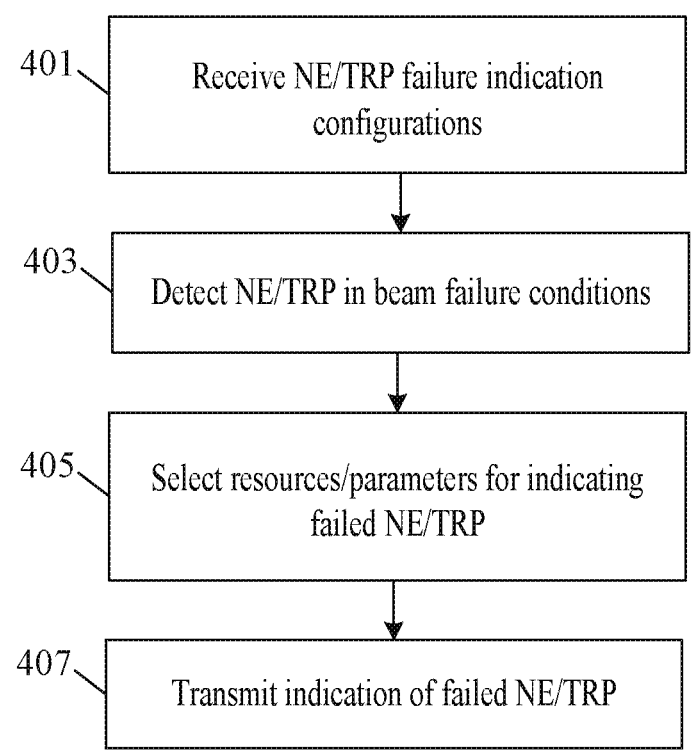
FIG. 4 illustrates an example of a flow diagram of a method according to various embodiments.

FIG. 4 illustrates an example of a method performed by a UE notifying a network that a NE (e.g., a TRP) is in beam failure condition. The UE may be similar to UE 610, illustrated in FIG. 6, according to certain embodiments. While some techniques described below may discuss two TRPs in example embodiments, any number of TRPs may be used. Furthermore, it is noted that some techniques below may also be applied to a group of beams and/or group of TRPs. For example, TRP beam failure indications may be configured to indicate a group of beams which have failed, where the beam group includes beams across multiple TRPs. Additionally, the methods described below may be similarly applied for link failure situations, where a TRP has experienced a radio link failure.

Figure 6:
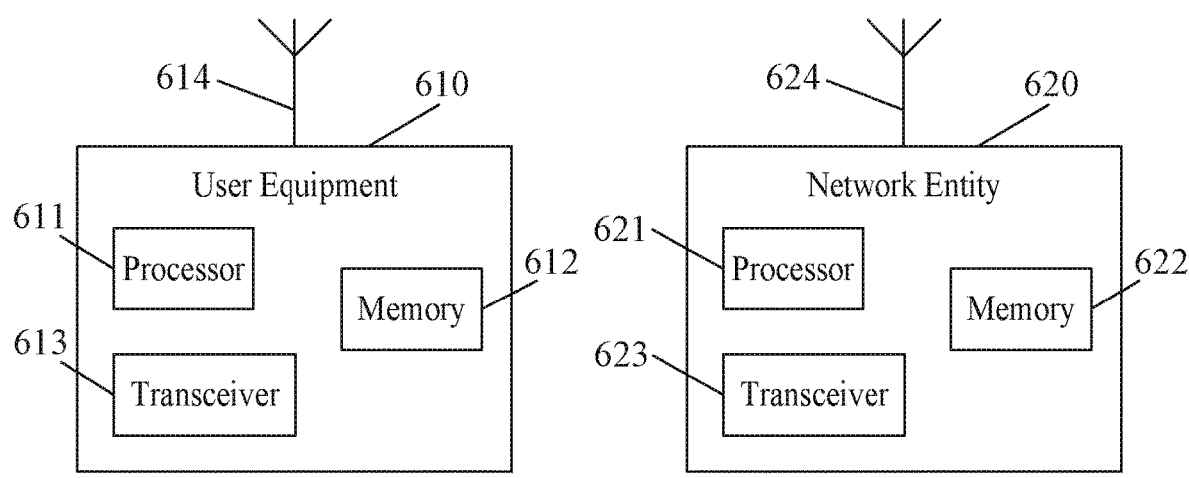
FIG. 6 illustrates an example of various network devices according to some embodiments.

At 401, the UE may receive from a first NE/TRP, such as NE 620 in FIG. 6, any number of TRP failure indication configurations, which may contain several dedicated/shared UL resources and/or related parameters, and may be configured to allow the UE to indicate that a NE is experiencing beam failure. For example, the dedicated/shared UL resources may be configured to carry any number of indications that at least one NE satisfies beam failure conditions. These indications may include indication/indicator of the failed NE and/or any other information configured to identify/characterize the failed NE. In various embodiments, TRP indicators could be a CORESETPoolIndex, wherein the UE may assume that CORESETs configured with the same CORESETPoolIndex are associated with the same NE/TRP. Additionally or alternatively, TRP indicators could be associated with any number of BFD-RS indexes, which may use a mapping and/or association between at least one NE and at least one UL resource configured to carry TRP beam failure indications.

As an example, the TRP failure indication configurations may include configurations of periodic PUCCH resources, such as 'config-1' and 'config-2,' each of which is configured to transmit one bit information (e.g., bit '1') indicating failed TRPs. Config-1 may assist the UE in indicating to the first NE that a second NE has failed, while conversely, config-2 may assist the UE in indicating to the second NE that the first NE has failed. In another example, the TRP failure indication configurations may provide/configure at least one UL MAC CE to transmit the TRP beam failure indications.

At 403, the UE may detect that at least one second NE/TRP, such as NE 620 in FIG. 6, is in a beam failure condition, such as the failed NE satisfying at least one beam failure condition threshold. The detection by the UE may be based on at least one BFD-RS subset. In another example, the failure detection in multi TRP may be based on one set of BFD-RS, wherein the failure may be detected on partial/subset of BFD-RS resources in the set.

At 405, in response to the detection at 403, the UE may select at least one resource and/or at least one parameter received at 401 to use in reporting the at least one second NE/TRP (i.e., NE 330). In various embodiments, the UE may select which resources and/or parameters to use based on which TRP(s) have failed, or conversely, which TRP(s) are not in failure condition and not failed. In an example with two TRPs, the UE may be configured to transmit at least one information bit, such as 1-bit length, associated with particular resources to the first NE indicating that the second NE is in a beam failure condition. In another example with more than two TRPs, the UE could transmit at least one indicator of the second TRPs on resources to the first NE.

As an example, the UE may detect that second NE is in beam failure condition, and that the first NE is not in a beam failure condition. Using the configurations received at 401, the UE may use config-1 to indicate the second NE. Specifically, the UE may use PUCCH resources provided in config-1 to transmit information-bit '1' to the first NE. For instance, config-1 may include resources with PUCCH format 0, and a specific cyclic shift may be configured to indicate the information-bit '1'. Alternatively, TRP failure indication configurations may cause the UE to indicate at least one identifier (e.g., CORESETPoolIndex) of the second NE via UL MAC CE to the first NE.

In certain embodiments, the UE may select periodic and/or semi-persistent PUCCH resources to indicate the failed TRPs, such as resources using PUCCH formats 0 and 1. For example, the UE may use a mapping/association between TRP failure indications, PUCCH resources, and resource/parameter configurations to indicate the failed TRPs, which could be based on any combination of cyclic shift, time/frequency resources, and spatial relation information.

Using the identified resources and/or parameters from 405, at 407, the UE may transmit at least one indication to the first NE indicating the at least one second NE and/or failure situation. In some embodiments, the UE may also transmit the at least one indication via explicit uplink control information (UCI). In an example embodiment, where the UE is served by two TRPs, two configurations of dedicated periodic PUCCH resources of format 0 may be configured, where a first configuration may allow transmission to one NE, while a second configuration may allow transmission to the other NE. Additionally, the at least one TRP failure indication may be transmitted via PUCCH format 0 by signaling, for example, with a single information bit, similar to a positive SR. As a result, in response to the UE detecting a TRP failure, the UE may use the configuration of periodic PUCCH resources associated with the second NE to transmit the TRP failure indication to the first NE.

In some embodiments, the failure detection and/or indication may be based on the BFD-RS resource sets associated with a specific TRP or determined based on the active TCI states for CORESETS of a CORESETPoolIndex. In some embodiments, the UE may provide the indication of the failed BFD-RS resource set. This indication may indicate to the network that specific TRP/network element is in failure condition. As an example, the UE may have been configured with beam failure detection resource sets q0_0 and q0_1 that may be associated respectively with TRP-1 and TRP-2. When the UE has determined that a beam failure has occurred on at least one of the resource sets, it may indicate the one or more failed resource sets. The resource sets for beam failure detection may have explicit identifier or the failure indication for a resource set may be associated with the recovery signalling configuration (e.g., resource set specific uplink signal or channel).

In some embodiments, the UE may use PUCCH formats having a bit map indicating failed RSs associated with the failed TRPs in ascending or descending order of CORESET index and/or CORESETPoolIndex. For example, where the UE is configured with 4 BFD-RS, the UE may transmit explicit information of the failed TRP/failed PDCCH beam combinations, allowing the network to identify TRP failures using bitmap information.

In various embodiments, PUSCH resources, such as configured grant resources, may be configured to carry TRP failure indications. For example, various parameters/configurations, such as DMRS, of configured-grant resources may carry the TRP failure indications. Additionally or alternatively, the UE may include TRP failure indications in the form of UCI on PUSCH—with or without uplink shared (transport) channels (UL-SCH) data. The UE may use various associations between PUSCH resources and the serving TRP(s) to select suitable resources to transmit TRP failure indications. For example, with two TRPs, two configured grant PUSCH configurations may carry the indication, wherein each configuration may correspond with transmissions towards a different TRP, for example, by explicitly associating each configured grant PUSCH configuration with a particular TRP. In order to avoid confusion where a configured grant occasion is used for data transmission only, each configuration may be configured with two DMRSs, where a first DMRS is used for TRP failure indication, and a second DMRS is used only for data transmission. Thus, when a TRP fails, the UE may notify the network by sending DMRS(s) indicating beam failure using the configured grant configuration(s) to another NE/TRP.

In some embodiments, the UE may be configured with any combination of UL RSs, such as sounding reference signals (SRS), resources, and related parameters to transmit TRP failure indications. For example, in case of two TRPs, two SRS resources may be used, with each SRS configured to carry TRP failure indications. When a TRP fails, UE 310 may transmit at least one SRS towards the non-failed TRP, informing the network that a NE has failed, and which one. Furthermore, the UE may use at least one UL MAC CE to signal TRP failure indications, where the UE may request UL grants via dedicated and/or shared SR resources to transmit the MAC CE indicating the TRP failure indications, such as if UL PUSCH resources are unavailable.

In certain embodiments, the UE may be configured with any number of aperiodic/semi-persistent beam reporting configurations that can be activated when the UE transmits TRP failure indication(s). For example, UL indications may indicate to the network, such as the non-failed NE, that a failure has been detected on a NE, and in response, the UE may receive a trigger to start beam reporting according to the configured UL resources. After new PDCCH beams are configured for the UE, whereby TCI states for PDCCH are activated, the UE may discontinue the reporting and/or the reporting resources may be deactivated. Additionally or alternatively, if the UE does not receive a new TCI state for the failed PDCCH after N reporting periods, the UE may discontinue reporting, and/or may discontinue monitoring the PDCCH on CORESET(s) of the failed NE. In an example embodiment, the non-failed NE may configure the UE to provide beam reporting, such as CSI-ReportConfig, of a specific set of reference signals, such as in CSI-ResourceConfig. The resource configuration and reporting may be specific for, and conditioned to, the indicated TRP.

Figure 5:
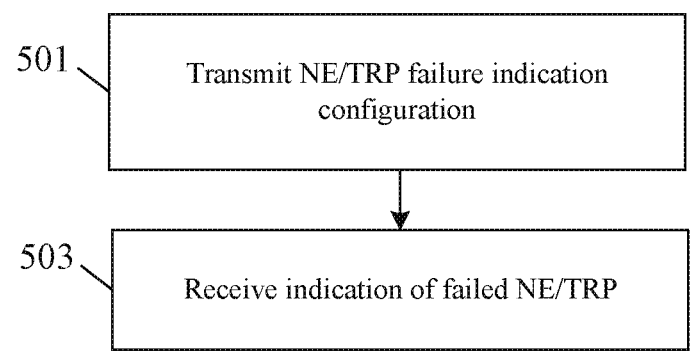
FIG. 5 illustrates an example of a flow diagram of a method according to some embodiments.

FIG. 5 illustrates an example of a method performed by a NE being notified by a UE that another NE (e.g., a TRP) is in a beam failure condition. The NE may be similar to NE 620, as illustrated in FIG. 6, according to certain embodiments. While one example is described below, it will be understood that other arrangements/numbers of NEs/TRPs may be used. Furthermore, it is noted that some techniques below may also be applied to a group of beams and/or group of TRPs. For example, TRP beam failure indications may be configured to indicate a group of beams which have failed, where the beam group includes beams across multiple TRPs. Additionally, the methods described below may be similarly applied for link failure situations, where a TRP has experienced a radio link failure.

At 501, the NE may transmit to a UE, such as UE 610 in FIG. 6, any number of TRP failure indication configurations, which may contain several dedicated/shared UL resources and/or related parameters, and may be configured to allow the UE to indicate that a TRP is experiencing beam failure. For example, the dedicated/shared UL resources may be configured to carry any number of indications that at least one TRP satisfies beam failure conditions. These indications may include indication/indicator of the failed TRP and/or any other information configured to identify/characterize the failed TRP. In various embodiments, TRP indicators could be a CORESETPoolIndex, wherein the UE may assume that CORESETs configured with the same CORESETPoolIndex are associated with the same TRP. Additionally or alternatively, TRP indicators could be associated with any number of BFD-RS indexes, which may use a mapping and/or association between at least one TRP and at least one UL resource configured to carry TRP beam failure indications.

As an example, the TRP failure indication configurations may include configurations of periodic PUCCH resources, such as 'config-1' and 'config-2,' each of which is configured to transmit one bit information (e.g., bit '1') indicating failed TRP(s). Config-1 may assist the UE in indicating to a first NE that a second NE has failed, while conversely, config-2 may assist the UE in indicating to the second NE that the first NE has failed. In another example, the TRP failure indication configurations may provide at least one UL MAC CE to transmit the TRP beam failure indications. At 503, the NE may receive from the UE at least one indication of failed TRP(s) using at least one resource(s)/parameter(s) from 501 selected by the UE.

FIG. 6 illustrates an example of a system according to certain example embodiments. In one example embodiment, a system may include multiple devices, such as, for example, UE 610 and/or NE 620.

UE 610 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 620 may be one or more of a TRP, base station, such as an evolved node B (eNB) or next generation node B (gNB), a next generation radio access network (NG RAN), a serving gateway, a server, and/or any other access node or combination thereof.

One or more of these devices may include at least one processor, respectively indicated as 611 and 621. At least one memory may be provided in one or more of devices indicated at 612 and 622. The memory may be fixed or removable. The memory may include computer program instructions or computer code contained therein. Processors 611 and 621 and memory 612 and 622 or a subset thereof, may be configured to provide means corresponding to the various blocks of FIGS. 3-5. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 6, transceivers 613 and 623 may be provided, and one or more devices may also include at least one antenna, respectively illustrated as 614 and 624. The device may have many antennas, such as an array of antennas configured for multiple input multiple output (MIMO) communications, or multiple antennas for multiple radio access technologies. Other configurations of these devices, for example, may be provided.

Transceivers 613 and 623 may be a transmitter, a receiver, or both a transmitter and a receiver, or a unit or device that may be configured both for transmission and reception.

Processors 611 and 621 may be embodied by any computational or data processing device, such as a central processing unit (CPU), application specific integrated circuit (ASIC), or comparable device. The processors may be implemented as a single controller, or a plurality of controllers or processors.

Memory 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 3-5). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 3-5. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Figure 7:
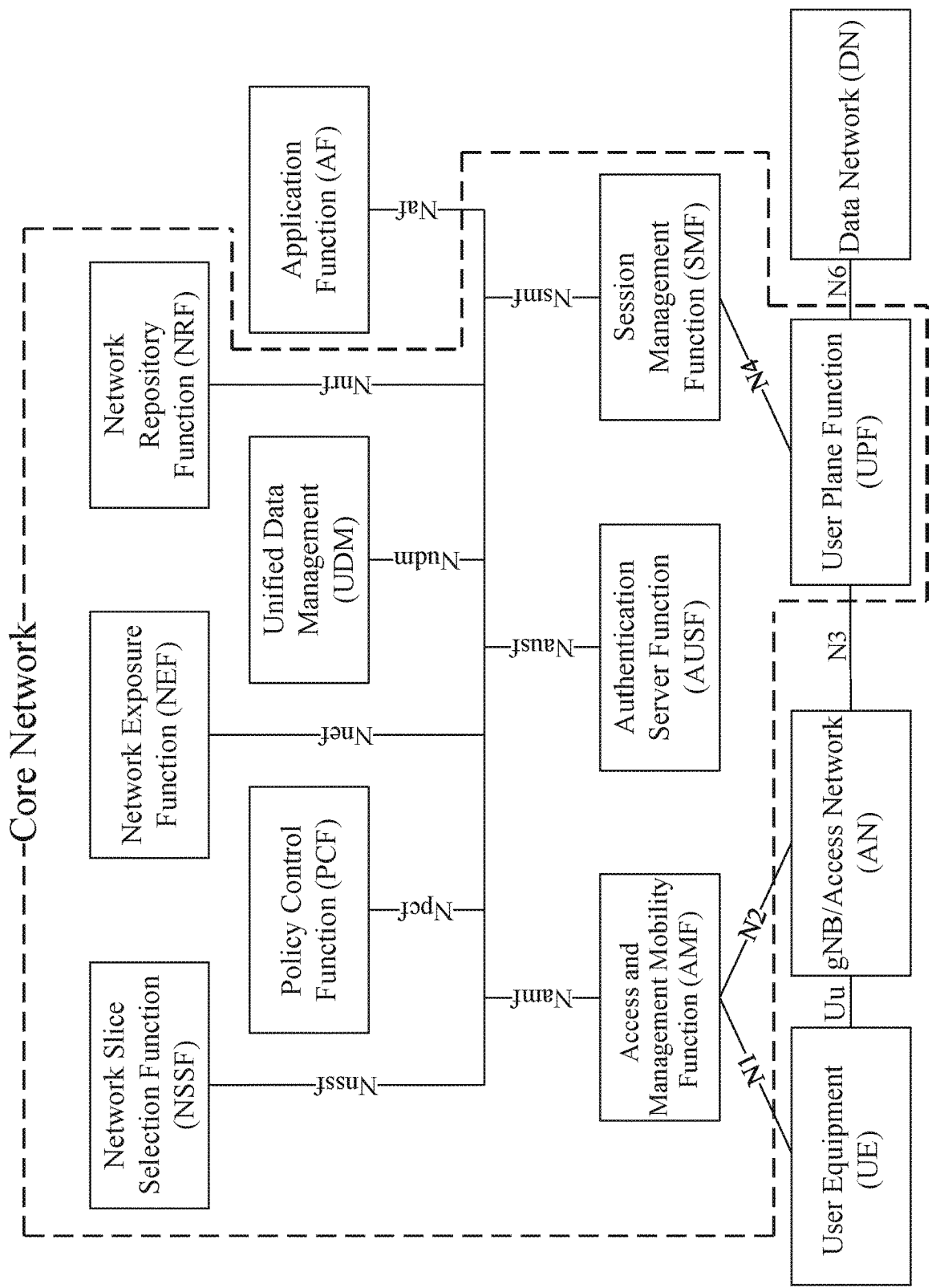
FIG. 7 illustrates an example of a 5G network and system architecture according to certain embodiments.

FIG. 7 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The UE and NE illustrated in FIG. 7 may be similar to UE 610 and NE 620, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

3GPP Third Generation Partnership Project
5G Fifth Generation
5GC Fifth Generation Core
5GS Fifth Generation System
AMF Access and Mobility Management Function
ASIC Application Specific Integrated Circuit
BFD-RS Beam Failure Detection Reference Signal
BLER Block Error Rate
BS Base Station
CBRA Contention-Based Random Access
CBSD Citizens Broadband Radio Service Device
CE Control Element
CFRA Contention-Free Random Access
CG Configured Grant
CN Core Network
CORESET Control Resource Set
CPU Central Processing Unit
CSI Channel State Information
CSI-RS Channel State Information Reference Signal
CRI Channel State Information Reference Signal Resource Indicator
$dB_{mW}$ Decibel-milliwatts
DCI Downlink Control Information
DL Downlink
DMRS Demodulation Reference Signal
DRS Downlink Reference Signal
eMBB Enhanced Mobile Broadband
eMTC Enhanced Machine Type Communication
eNB Evolved Node B
eOLLA Enhanced Outer Loop Link Adaptation
EPS Evolved Packet System
FDD Frequency Division Duplex
FR Frequency Range
gNB Next Generation Node B
GPS Global Positioning System
HDD Hard Disk Drive
IEEE Institute of Electrical and Electronics Engineers
L1 Layer 1
L2 Layer 2
LTE Long-Term Evolution
LTE-A Long-Term Evolution Advanced
MAC Medium Access Control
MBS Multicast and Broadcast Systems
MCS Modulation and Coding Scheme
MEMS Micro Electrical Mechanical System
MIMO Multiple Input Multiple Output
MME Mobility Management Entity
mMTC Massive Machine Type Communication
MPDCCH Machine Type Communication Physical Downlink Control Channel
MTC Machine Type Communication
NAS Non-Access Stratum
NE Network Entity
NG Next Generation
NG-eNB Next Generation Evolved Node B
NG-RAN Next Generation Radio Access Network
NR New Radio
NR-U New Radio Unlicensed
PBC Physical Broadcast Channel
PDA Personal Digital Assistance
PDCCH Physical Downlink Control Channel
PDSCH Physical Downlink Shared Channel
PDU Protocol Data Unit
PHY Physical
PRACH Physical Random Access Channel
PRB Physical Resource Block
PUCCH Physical Uplink Control Channel
PUSCH Physical Uplink Shared Channel
QCL Quasi Co-location
QoS Quality of Service
RACH Random Access Channel
RAM Random Access Memory
RAN Radio Access Network
RAT Radio Access Technology
RE Resource Element
RLC Radio Link Control
RRC Radio Resource Control
RS Reference Signal
RSRP Reference Signal Received Power
SMF Session Management Function
SR Scheduling Request
SRB Signaling Radio Bearer
SSB Synchronization Signal Block
TB Transport Block
TCI Transmission Configuration Indicator
TDD Time Division Duplex
TR Technical Report
TRP Transmission Reception Point
TS Technical Specification
Tx Transmission
UCI Uplink Control Information
UE User Equipment
UL Uplink
UMTS Universal Mobile Telecommunications System
UPF User Plane Function
URLLC Ultra-Reliable and Low-Latency Communication
UTRAN Universal Mobile Telecommunications System Terrestrial Radio Access Network
WLAN Wireless Local Area Network

We claim:

1. A method, comprising:
receiving, by a user equipment, at least one network entity failure indication configuration;
detecting, by the user equipment, that at least one first network entity satisfies at least one beam-failure condition, wherein the at least one network entity failure indication configuration comprises at least one uplink medium access control control element comprising at least one indicator associated with the at least one detected first network entity satisfying the at least one beam-failure condition;
selecting, by the user equipment, at least one resource based on the at least one received network entity failure indication configuration, the at least one resource configuring transmission of at least one indication that the detected at least one first network entity satisfies the at least one beam-failure condition; and
transmitting, by the user equipment, the at least one indication of the at least one first network entity that satisfies the at least one beam-failure condition.

2. The method of claim 1, wherein the transmitting the at least one indication is transmitted to at least one second network entity, wherein the at least one second network entity is in a non-failure condition.

3. The method of claim 1, wherein each of the at least one network entity failure indication configuration is associated with at least one network entity.

4. The method of claim 1, wherein the detection that a network entity is in beam-failure condition is performed on at least one beam-failure detection reference signal subset associated to that network entity.

5. The method of claim 1, wherein the at least one network entity failure indication is transmitted via at least one uplink reference signal.

6. The method of claim 1, wherein the at least one indication comprises at least one medium access control control element transmitted via at least one physical uplink shared channel.

7. The method of claim 1, wherein the user equipment is configured with at least one aperiodic or semi-persistent beam reporting configuration configured for activation upon the user equipment detecting the at least one failed network entity or sending the corresponding network entity failure indication.

8. A method, comprising:
transmitting, by a network entity, at least one network entity failure indication configuration, wherein the at least one network entity failure indication configuration comprises at least one uplink medium access control control element comprising at least one indicator associated with at least one detected first network entity satisfying at least one beam-failure condition,
wherein at least one resource is selected based on the at least one network entity failure indication configuration, the at least one resource configuring transmission of at least one indication that the at least one detected first network entity satisfies the at least one beam-failure condition; and
receiving, by the network entity, at least one indication that at least one network entity satisfies at least one beam-failure condition.

9. The method of claim 8, wherein the network entity is in a non-failure condition.

10. The method of claim 8, wherein each of the at least one network entity failure indication configuration is associated with at least one network entity.

11. An apparatus, comprising:
at least one processor; and
at least one memory including computer program code, wherein the at least one memory and the computer program code are configured to, with the at least one processor, cause the apparatus at least to:
receive at least one network entity failure indication configuration;
detect that at least one first network entity satisfies at least one beam-failure condition, wherein the at least one network entity failure indication configuration comprises at least one uplink medium access control control element comprising at least one indicator associated with the at least one detected first network entity satisfying the at least one beam-failure condition;
select at least one resource based on the at least one received network entity failure indication configuration, the at least one resource configuring transmission of at least one indication that the detected at least one first network entity satisfies the at least one beam-failure condition; and
transmit the at least one indication of the at least one first network entity that satisfies the at least one beam-failure condition.

12. The apparatus of claim 11, wherein the at least one indication is transmitted to at least one second network entity, wherein the at least one second network entity is in a non-failure condition.

13. The apparatus of claim 11, wherein each of the at least one network entity failure indication configuration is associated with at least one network entity.

14. The apparatus of claim 11, wherein the at least one indication comprises at least one medium access control control element transmitted via at least one physical uplink shared channel.

* * * * *